(12) United States Patent
Nagai et al.

(10) Patent No.: US 10,934,882 B2
(45) Date of Patent: Mar. 2, 2021

(54) TURBOCHARGER

(71) Applicant: TOYOTA JIDOSHA KABUSHIKI KAISHA, Toyota (JP)

(72) Inventors: Kouji Nagai, Nagoya (JP); Akitoshi Iwata, Seto (JP); Akihiro Asano, Toyota (JP); Takayasu Ogasawara, Nissin (JP); Yasuko Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/530,118

(22) Filed: Aug. 2, 2019

(65) Prior Publication Data
US 2020/0088062 A1 Mar. 19, 2020

(30) Foreign Application Priority Data
Sep. 13, 2018 (JP) .............................. JP2018-171207

(51) Int. Cl.
| | | |
|---|---|---|
| *F01D 17/10* | (2006.01) | |
| *F02B 37/24* | (2006.01) | |
| *F02C 6/12* | (2006.01) | |
| *F02B 37/18* | (2006.01) | |

(52) U.S. Cl.
CPC .......... *F01D 17/105* (2013.01); *F02B 37/183* (2013.01); *F02B 37/186* (2013.01); *F02B 37/24* (2013.01); *F02C 6/12* (2013.01); *F05D 2220/40* (2013.01); *F05D 2260/50* (2013.01)

(58) Field of Classification Search
CPC ...... F02B 37/18; F02B 37/183; F02B 37/186; F01D 17/105
See application file for complete search history.

(56) References Cited

U.S. PATENT DOCUMENTS

| | | | | |
|---|---|---|---|---|
| 5,205,125 A | * | 4/1993 | Potter | F02B 37/186 137/527 |
| 2002/0050138 A1 | * | 5/2002 | Deacon | F02B 37/183 60/602 |
| 2003/0196435 A1 | * | 10/2003 | Heath | F02B 37/186 60/602 |
| 2010/0024414 A1 | * | 2/2010 | Hittle | F02M 26/47 60/602 |

(Continued)

FOREIGN PATENT DOCUMENTS

| | | |
|---|---|---|
| WO | 2012/131997 A1 | 10/2012 |
| WO | WO-2015190361 A1 * | 12/2015 ............. F02B 37/18 |

OTHER PUBLICATIONS

WO-2015190361-A1 Iwata Kazuaki—English Translation PUB Dec. 2015 (Year: 2015).*

*Primary Examiner* — Audrey K Bradley
*Assistant Examiner* — Edward Bushard
(74) *Attorney, Agent, or Firm* — Oliff PLC

(57) ABSTRACT

A wastegate is attached to a turbine housing of a turbocharger. The wastegate opens and closes a bypass passage. An actuator is coupled to the wastegate via a link mechanism. The link mechanism includes a link rod and a link arm. The longitudinal direction of the link rod in a state in which the bypass passage is fully closed is defined as a width direction of the link arm. The coupling center position in the link arm to which the link rod is coupled is located at a position offset in a direction in which the link rod moves to open the wastegate from a middle of the link arm in the width direction.

2 Claims, 2 Drawing Sheets

(56) References Cited

U.S. PATENT DOCUMENTS

2011/0020108 A1* 1/2011 Axelsson ............... F02B 37/18
                                                                 415/66
2012/0328416 A1    12/2012 Igarashi et al.

* cited by examiner

TURBOCHARGER

BACKGROUND

1. Field

The present disclosure relates to a turbocharger.

2. Description of Related Art

As described in International Publication No. 2012/131997, a turbine wheel is accommodated in a turbine housing of a turbocharger and rotated by flow of exhaust gas. A bypass passage is defined in the turbine housing to bypass the turbine wheel by connecting an exhaust-upstream section to an exhaust-downstream section with respect to the turbine wheel. Also, a wastegate is attached to the turbine housing to selectively open and close the downstream end of the bypass passage. The wastegate is coupled to an actuator that selectively opens and closes the wastegate through a link mechanism.

In the turbocharger, if the driving force of the actuator is continuously applied to the link mechanism, the link mechanism is deformed in some cases. Specifically, in some cases, to cause the wastegate to maintain the bypass passage in a fully closed state, force is continuously applied to the wastegate in the closing direction so that the wastegate cannot be opened due to the pressure of exhaust gas in the bypass passage. At this stage, the wastegate is fully closed and cannot move further in the closing direction. The force that acts to drive the wastegate in the closing direction is thus continuously applied to the link mechanism. The link mechanism of the turbocharger thus must be configured not to be easily deformed by the force acting to drive the wastegate in the closing direction.

SUMMARY

In a general aspect, a turbocharger is provided that includes a turbine housing that accommodates a turbine wheel, a bypass passage defined in the turbine housing, a wastegate, a link mechanism, and an actuator. The bypass passage connects an exhaust-upstream section to an exhaust-downstream section with respect to the turbine wheel, thereby bypassing the turbine wheel. The wastegate is attached to the turbine housing to selectively open and close a downstream end of the bypass passage. The link mechanism is coupled to the wastegate to transmit driving force to the wastegate. The actuator is coupled to the link mechanism. The turbine housing has a valve seat portion in an inner wall surface of the turbine housing. The wastegate includes a valve member and a shaft. The valve member contacts the valve seat portion at the time the bypass passage is fully closed. The shaft extends from the valve member and is pivotally supported by a wall portion of the turbine housing. The link mechanism includes an elongated link rod and a link arm. The elongated link rod moves from one side to the other in the longitudinal direction of the link rod by receiving the driving force of the actuator. The link arm is coupled to the link rod, converts movement of the link rod to rotation, and transmits the rotation to the shaft. The longitudinal direction of the link rod in a state in which the bypass passage is fully closed is defined as a width direction of the link arm. A coupling center position in the link arm to which the link rod is coupled is located at a position offset in a direction in which the link rod moves to open the wastegate from a middle of the link arm in the width direction.

In the above-described configuration, the link arm has a great width (dimension) on the side on which the driving force is applied to the link arm at the time the wastegate is driven in the closing direction. Therefore, even if the force is continuously applied to the link arm at the time the bypass passage is fully closed, deformation of the link arm is unlikely to occur.

In the above-described configuration, with respect to an imaginary straight line connecting the coupling center position in the link arm to which the link rod is coupled to a coupling center position in the link arm to which the shaft is coupled, a middle line of the link arm in a transverse direction orthogonal to an extending direction of the link arm may be curved to protrude in a direction in which the link rod moves to fully close the bypass passage.

In the above-described configuration, the link arm is curved. As a result, the force applied to the link arm at the time the wastegate is driven in the closing direction tends to be dispersed in the entire link arm. This makes it unlikely that the force will concentrate on a specific section of the link arm and deform the link arm.

In the above-described configuration, the turbine housing includes a fixing flange that is configured to fix the turbine housing to a member located on an exhaust-upstream side. The fixing flange has a bolt hole that extends through the fixing flange, wherein a bolt is inserted through the bolt hole. When viewed in a direction of a central axis of the bolt hole, at least part of the bolt hole is located in a range of an imaginary triangle surrounded by, in a state in which the bypass passage is fully closed, the coupling center position in the link arm to which the link rod is coupled, the coupling center position in the link arm to which the shaft is coupled, and an end of the link rod opposite to the link arm. An edge of the link arm located inside the imaginary triangle may be curved to protrude outward from the imaginary triangle.

In this configuration, an edge located inside the imaginary triangle in the link arm, that is, an edge located on the side on which the bolt hole is located, is curved outward from the imaginary triangle. This facilitates ensuring space for handling a tool such as a wrench at the time of inserting a bolt through the bolt hole and fastening the bolt using the tool.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment will now be described with reference to FIGS. 1 to 4. Firstly, the configuration of an internal combustion engine 100 of a vehicle will be schematically described.

Figure 1:
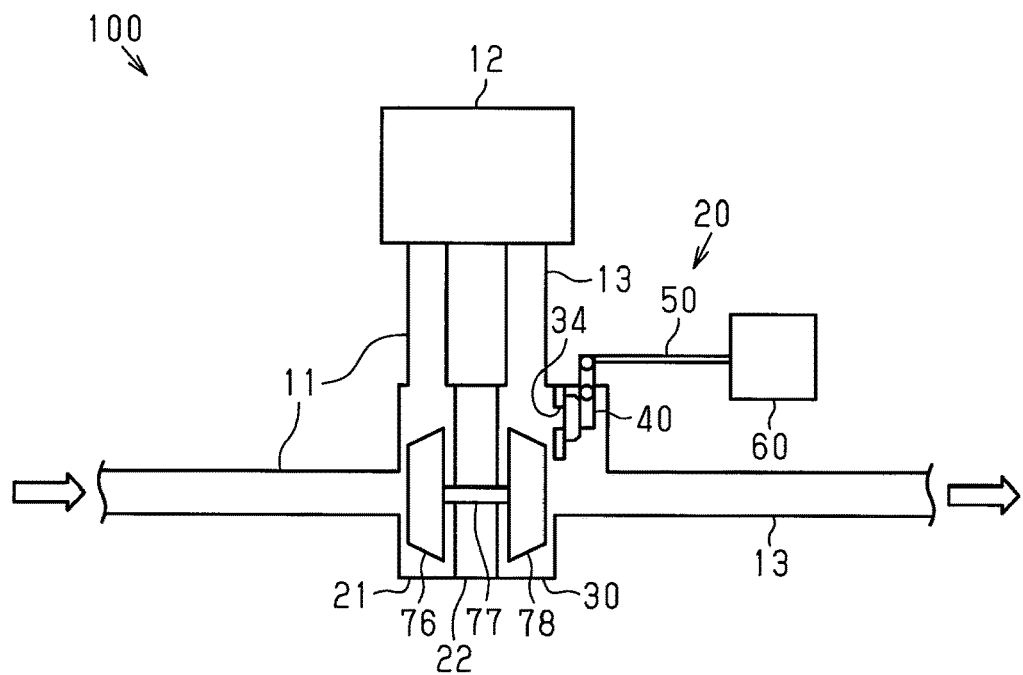
FIG. 1 is a schematic diagram of an internal combustion engine.

As shown in FIG. 1, the engine 100 has an intake passage 11. Intake air flows from outside the engine 100 into the intake passage 11. A cylinder 12 is connected to the intake passage 11 to mix fuel with intake air and burn the mixture. An exhaust passage 13 is connected to the cylinder 12 and discharges exhaust gas from the cylinder 12.

The engine 100 includes a turbocharger 20 to compress intake air using flow of exhaust gas. The turbocharger 20 has a compressor housing 21 and a turbine housing 30. The compressor housing 21 is attached to the intake passage 11 and the turbine housing 30 is attached to the exhaust passage 13. The compressor housing 21 and the turbine housing 30 are connected to each other through a bearing housing 22 of the turbocharger 20.

A turbine wheel 78 is accommodated in the turbine housing 30 and rotated by flow of exhaust gas. One end of a coupling shaft 77 is connected to the turbine wheel 78. A middle section in the axial direction of the coupling shaft 77 is accommodated in the bearing housing 22. The coupling shaft 77 is rotationally supported by a non-illustrated bearing in the bearing housing 22. A compressor wheel 76 is connected to the other end of the coupling shaft 77 and accommodated in the compressor housing 21.

The turbine housing 30 of the turbocharger 20 and configurations related to the turbine housing 30 will hereafter be specifically described.

Figure 2:
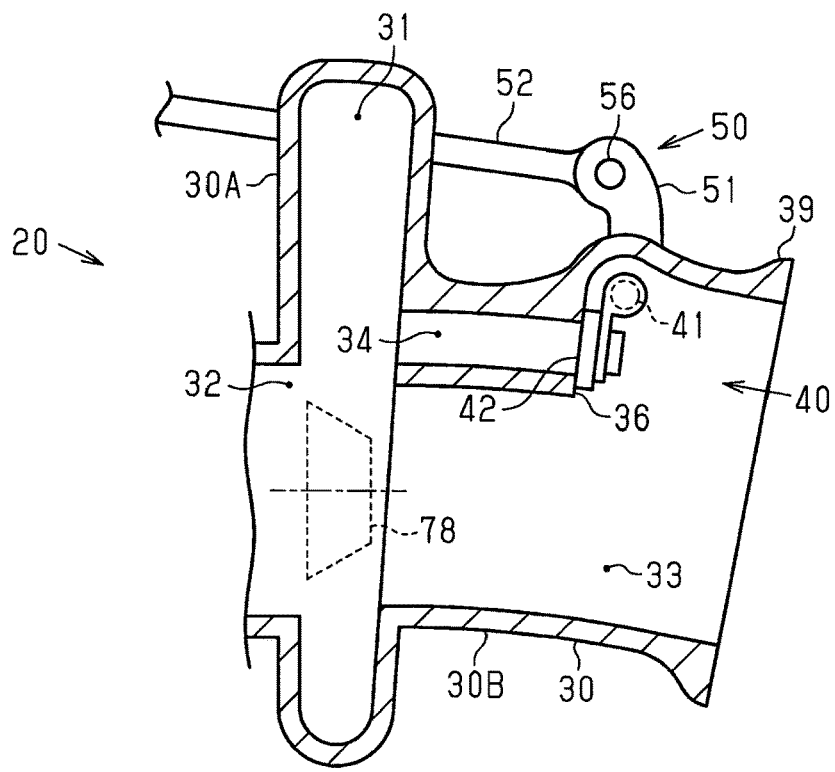
FIG. 2 is a cross-sectional view of the turbocharger.

As illustrated in FIG. 2, the turbine housing 30 includes a cylindrical tubular portion 30B and an arcuate portion 30A. The tubular portion 30B extends in the axial direction of the turbine wheel 78. The arcuate portion 30A extends in a manner surrounding the outer circumference of the tubular portion 30B. A scroll passage 31 is defined in the arcuate portion 30A of the turbine housing 30 to introduce exhaust gas from outside. The scroll passage 31 extends in a circumferential direction about the rotational axis of the turbine wheel 78, that is, the rotational axis of the coupling shaft 77, in a manner surrounding the turbine wheel 78.

Figure 3:
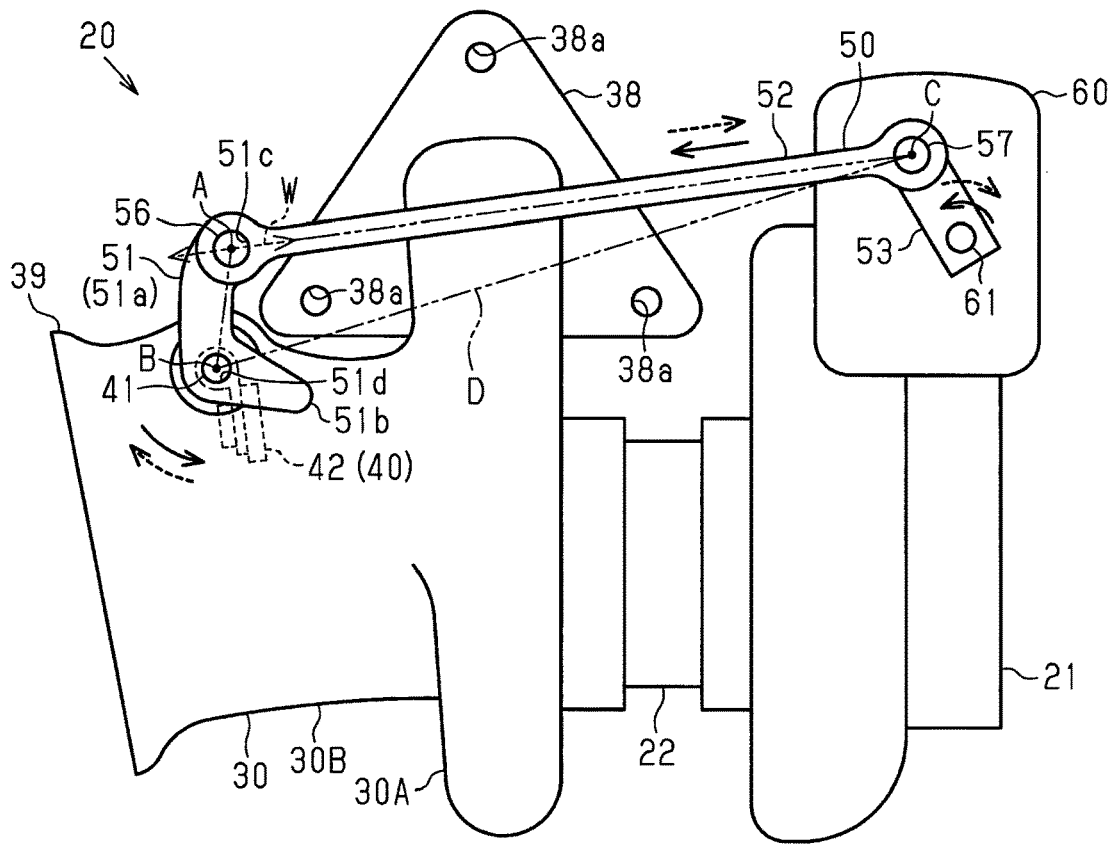
FIG. 3 is a front view of the turbocharger.

With reference to FIG. 3, an upstream-side flange 38 extends outward from the arcuate portion 30A of the turbine housing 30. The upstream-side flange 38 is located on the upstream end of the scroll passage 31. As viewed from front, the upstream-side flange 38 is shaped substantially like a triangle. A bolt hole 38a for receiving a non-illustrated bolt extends through each of the apex sections of the triangle defined by the upstream-side flange 38 in the thickness direction. By inserting non-illustrated bolts through the bolt holes 38a, the upstream-side flange 38 of the turbine housing 30 is fixed to the exhaust passage 13 on the upstream side of the turbine housing 30. In the present embodiment, the upstream-side flange 38 corresponds to a fixing flange.

With reference to FIG. 2, a substantially columnar accommodation space 32 is defined in the tubular portion 30B of the turbine housing 30 to accommodate the turbine wheel 78. The accommodation space 32 is connected to the downstream end of the scroll passage 31. An outlet passage 33 is defined in the tubular portion 30B of the turbine housing 30 to discharge exhaust gas to the outside. The outlet passage 33 is connected to the accommodation space 32 substantially in the direction of the rotational axis of the turbine wheel 78. A downstream-side flange 39 extends outward from the tubular portion 30B of the turbine housing 30. The downstream-side flange 39 is located at the downstream end of the outlet passage 33. The downstream-side flange 39 of the turbine housing 30 is held by a non-illustrated clamp member and thus fixed to the exhaust passage 13 on the downstream side of the turbine housing 30.

Exhaust gas passes through the scroll passage 31 in the turbine housing 30 and is then blown onto the turbine wheel 78. The exhaust gas then passes through the outlet passage 33 in the turbine housing 30 and is thus discharged into the exhaust passage 13 on the downstream side of the turbine housing 30. When the exhaust gas is blown onto the turbine wheel 78 through the scroll passage 31, the exhaust gas rotates the turbine wheel 78. This rotates the compressor wheel 76 through the coupling shaft 77, thus performing forced induction of intake air.

A bypass passage 34 is defined in the turbine housing 30 and connects the scroll passage 31 to the outlet passage 33. That is, the bypass passage 34 connects an exhaust-upstream section to an exhaust-downstream section with respect to the turbine wheel 78, thus bypassing the turbine wheel 78. The bypass passage 34 is a hole that has a substantially circular cross section and extends through a wall portion that separates the scroll passage 31 and the outlet passage 33 from each other. The turbine housing 30 has a valve seat portion 36 on an inner wall surface of the turbine housing 30. Specifically, the valve seat portion 36 is disposed in a manner surrounding the downstream-side opening of the bypass passage 34 on the inner wall surface of the turbine housing 30.

As shown in FIG. 2, a wastegate 40 is arranged in the outlet passage 33 in the turbine housing 30 to selectively open and close the downstream end of the bypass passage 34. Referring to FIG. 1, the wastegate 40 is coupled to an actuator 60 through a link mechanism 50. The link mechanism 50 transmits the driving force of the actuator 60 to the wastegate 40. As illustrated in FIG. 3, the actuator 60 is fixed to an outer wall surface of the compressor housing 21. In the present embodiment, the actuator 60 is an electric motor.

As illustrated in FIG. 3, a first end of a substantially rectangular plate-shaped link member 53 is fixed to an output shaft 61 of the actuator 60. A second end of the link member 53 is coupled to a first end of a link rod 52 having an elongated shape as a whole through a coupling pin 57. The first end of the link rod 52 is pivotal relative to the second end of the link member 53. The link rod 52 extends from the compressor housing 21 to the turbine housing 30. A link arm 51 is coupled to a second end of the link rod 52 through a coupling pin 56. In the present embodiment, the link arm 51, the link rod 52, the link member 53, the coupling pin 56, and the coupling pin 57 configure the link mechanism 50.

Figure 4:
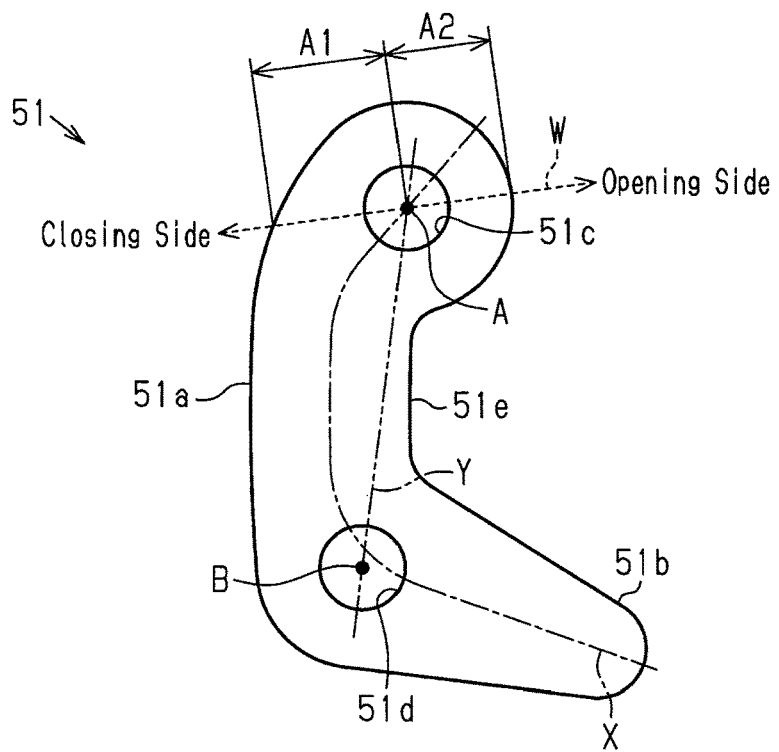
FIG. 4 is a front view of the link arm.

Referring to FIG. 4, the link arm 51 extends in an arcuately curved manner as a whole. A coupling hole 51c extends in the thickness direction through a first end of the link arm 51 in the extending direction. As illustrated in FIG. 3, the coupling pin 56 is inserted through the coupling hole 51c. The first end of the link arm 51 is pivotally coupled to the second end of the link rod 52 through the coupling pin 56 inserted through the coupling hole 51c. With reference to FIG. 4, a fixing hole 51d extends in the thickness direction through the link arm 51 at a position spaced from the coupling hole 51c in the extending direction.

As shown in FIG. 3, a shaft 41 of the wastegate 40 is fixed to the fixing hole 51d of the link arm 51. Referring to FIG. 2, the shaft 41 extends through a wall portion of the turbine housing 30 and has a part reaching the interior of the turbine housing 30 (the interior of the outlet passage 33). The shaft 41 is pivotally supported by the wall portion of the turbine housing 30. A valve member 42 is fixed to the end of the shaft 41 that is located in the turbine housing 30. The valve member 42 contacts the valve seat portion 36 of the turbine housing 30.

As represented by the solid arrow in FIG. 3, the output shaft 61 of the actuator 60 may pivot in a first circumferential direction of the output shaft 61, or counterclockwise as viewed in the drawing. This pivots the link member 53 in the first circumferential direction of the output shaft 61, or counterclockwise as viewed in FIG. 3. The link rod 52 thus moves to a first side in the longitudinal direction of the link rod 52, that is, leftward as viewed in the drawing. The link arm 51 then converts the longitudinal movement of the link rod 52 into rotation, thus pivoting in a first circumferential direction of the shaft 41, which is counterclockwise as viewed in FIG. 3. This pivots the wastegate 40 in the first circumferential direction of the shaft 41, or counterclockwise as viewed in the drawing. The valve member 42 of the wastegate 40 thus contacts the valve seat portion 36 of the turbine housing 30. In this manner, the downstream end of the bypass passage 34 is blocked by the valve member 42 of the wastegate 40. As a result, the bypass passage 34 is switched to a fully closed state.

In contrast, as represented by the broken arrow in FIG. 3, the output shaft 61 of the actuator 60 may pivot in a second circumferential direction of the output shaft 61, or clockwise as viewed in the drawing. This pivots the link member 53 in the second circumferential direction of the output shaft 61, or clockwise as viewed in FIG. 3. The link rod 52 thus moves to a second side in the longitudinal direction of the link rod 52, that is, rightward as viewed in the drawing. The link arm 51 then converts the longitudinal movement of the link rod 52 into rotation, thus pivoting in a second circumferential direction of the shaft 41, which is clockwise as viewed in FIG. 3. This pivots the wastegate 40 in the second circumferential direction of the shaft 41, or clockwise as viewed in the drawing. The valve member 42 of the wastegate 40 thus separates from the valve seat portion 36 of the turbine housing 30. In this manner, the downstream end of the bypass passage 34 is unblocked by the valve member 42 of the wastegate 40. The bypass passage 34 is thus switched to an open state. As a result, in the present embodiment, the driving force of the actuator 60 is transmitted to the shaft 41 of the wastegate 40 through the link member 53, the link rod 52, and the link arm 51 of the link mechanism 50.

Next, the shape of the link arm 51 will be described in detail. In the description below, the longitudinal direction of the link rod 52 in the state in which the wastegate 40 fully closes the bypass passage 34, as shown in FIG. 3, is defined as the width direction W of the link arm 51.

With reference to FIG. 4, the link arm 51 is U-shaped as a whole. The link arm 51 has an arcuately curved main body 51a and a stopper portion 51b. The stopper portion 51b extends from the main body 51a. The coupling hole 51c is located at a first end of the main body 51a, that is, the upper end as viewed in FIG. 4. The link arm 51 is coupled to the link rod 52 by means of the coupling hole 51c. The fixing hole 51d is located at a second end of the main body 51a, that is, the lower end as viewed in the drawing. The shaft 41 is fixed by means of the fixing hole 51d. The stopper portion 51b projects from the second end of the main body 51a to a first side in the width direction W, which is rightward as viewed in FIG. 4. In the present embodiment, the stopper portion 51b extends in the direction in which the link rod 52 moves to open the wastegate 40, as viewed in the width direction W. A non-illustrated projection projects from the tubular portion 30B of the turbine housing 30. The stopper portion 51b comes into contact with the projection as the link arm 51 pivots in the second circumferential direction of the shaft 41, which is the opening direction. This restricts the pivot of the wastegate 40 in the opening direction.

The position of the center of the coupling hole 51c in the link arm 51 is the coupling center position A of the link arm 51 to which the link rod 52 is coupled. The position of the coupling hole 51c is determined such that the coupling center position A is located offset in the direction in which the link rod 52 moves to open the wastegate 40, which is rightward as viewed in FIG. 4, from the middle of the link arm 51 in the width direction W.

The position of the center of the fixing hole 51d in the link arm 51 is the coupling center position B of the link arm 51 to which the shaft 41 is coupled. As represented by the long dashed double-short dashed line in FIG. 4, the line connecting the coupling center position A to the coupling center position B in the link arm 51 is defined as the imaginary straight line Y. The middle line X in a transverse direction orthogonal to the extending direction of the link arm 51, as represented by the long dashed short dashed line in FIG. 4, is curved to protrude in the direction in which the link rod 52 moves to fully close the bypass passage 34, which is leftward as viewed in the drawing, with respect to the imaginary straight line Y (the long dashed double-short dashed line in FIG. 4).

With reference to FIG. 3, as viewed in the direction of the central axis of each bolt hole 38a, the area within the following points: the coupling center position A of the link arm 51 to which the link rod 52 is coupled, the coupling center position B of the link arm 51 to which the shaft 41 is coupled, and the end C of the link rod 52 opposite to the link arm 51 in the state in which the bypass passage 34 is fully closed is defined as the imaginary triangle D. In the present embodiment, as viewed in the direction of the central axis of each bolt hole 38a, the entire area of the one of the three bolt holes 38a closest to the link arm 51 is located within the imaginary triangle D. Also, with reference to FIG. 4, an edge 51e of the link arm 51 is located inside the imaginary triangle D and curved to protrude outward from the imaginary triangle D (leftward as viewed in the drawing).

The operation and advantages of the present embodiment will now be described.

In the present embodiment, as illustrated in FIG. 2, to cause the wastegate 40 to maintain the bypass passage 34 in the fully closed state, the actuator 60, in some cases, continuously applies force to the wastegate 40 in the closing direction through the link mechanism 50 so that the pressure of exhaust gas in the bypass passage 34 cannot open the wastegate 40. At this stage, the wastegate 40 is in contact with the valve seat portion 36 of the turbine housing 30 and cannot move further in the closing direction. The force that acts to drive the wastegate 40 in the closing direction is thus continuously applied to the wastegate 40 and the link mechanism 50, which is coupled to the wastegate 40. Further, as shown in FIG. 3, the link arm 51 of the link mechanism 50 converts the movement of the link rod 52 in the first longitudinal direction, or leftward as viewed in the drawing, into the rotation of the shaft 41 in the first circumferential direction, which is counterclockwise as viewed in the drawing. The force is thus continuously applied to the portion of the link arm 51 coupled to the link rod 52 in the first longitudinal direction of the link rod 52, that is, leftward as viewed in FIG. 3. This may deform the link arm 51 excessively in the longitudinal direction of the link rod 52, thus hampering accurate control of the opening degree of the wastegate 40.

However, in the present embodiment, with reference to FIG. 4, the coupling center position A of the link arm 51 to which the link rod 52 is coupled is located offset in the direction in which the link rod 52 moves to open the wastegate 40, which is rightward as viewed in the drawing, from the middle of the link arm 51 in the width direction W. That is, the width A1 on the side on which the driving force is applied to the link arm 51 at the time the wastegate 40 is driven in the closing direction is greater than the width A2 on the side on which the driving force is applied to the link arm 51 at the time the wastegate 40 is driven in the opening direction. Therefore, compared to a configuration in which the widths A1, A2 of the link arm 51 are the same, the link arm 51 of the present embodiment has improved rigidity against the force acting in the first longitudinal direction of the link rod 52, or leftward as viewed in FIG. 4. As a result, even if force is continuously applied to the link arm 51 at the time the bypass passage 34 is fully closed, deformation of the link arm 51 is unlikely to occur.

If the main body 51a of the link arm 51 extends straight, the link arm 51 as a whole would be shaped in a bent manner at the boundary between the main body 51a and the stopper portion 51b. In this case, the force transmitted through the link rod 52 concentrates on the bent portion of the link arm 51, thus deforming the link arm 51 starting from the bent portion.

However, in the present embodiment, as shown in FIG. 4, the middle line X (the long dashed short dashed line in the drawing) in the transverse direction orthogonal to the extending direction of the link arm 51 is curved to protrude in the direction in which the link rod 52 moves to fully close the bypass passage 34, that is, leftward as viewed in the drawing, with respect to the imaginary straight line Y (the long dashed double-short dashed line in the drawing). As a result, the force applied to the link arm 51 at the time the wastegate 40 is driven in the closing direction tends to be dispersed in the entire link arm 51. This makes it unlikely that the force will concentrate on a specific section of the link arm 51 and deform the link arm 51.

To attach the upstream-side flange 38 of the turbine housing 30 to the exhaust passage 13, bolts are inserted through the bolt holes 38a of the upstream-side flange 38 and fastened using a tool such as a wrench. To facilitate the handling of the tool at this stage, it is preferable that necessary space be ensured around each of the bolt holes 38a.

In this regard, as illustrated in FIG. 4, in the present embodiment, the edge 51e, which is located inside the imaginary triangle D in the link arm 51, is curved to protrude outward from the imaginary triangle D, or leftward as viewed in the drawing. In this configuration, the edge 51e is located on the side on which the bolt holes 38a are located and curved outward from the imaginary triangle D. This facilitates ensuring space for handling a tool such as a wrench at the time of inserting a bolt through each bolt hole 38a and fastening the bolt using the tool. The tool is thus unlikely to interfere with the link arm 51.

The present embodiment may be modified as follows. The above-described embodiment and the following modifications can be combined as long as the combined modifications remain technically consistent with each other.

In the above-described embodiment, the shape of the link arm 51 can be modified. For example, the link arm 51 may be shaped like a rectangular plate. Also in this configuration, the coupling center position A of the link arm 51 to which the link rod 52 is coupled (the position of the center of the coupling hole 51c) simply needs to be located at a position offset in the direction in which the link rod 52 moves to open the wastegate 40 from the middle of the link arm 51 in the width direction W.

The middle line X in the transverse direction orthogonal to the extending direction of the link arm 51 may extend straight. That is, a link arm 51 shaped like a rectangular plate, as cited by way of example in the above-described modification, have a straight middle line X.

The stopper portion 51b may be omitted from the link arm 51. For example, the stopper portion 51b may be omitted from the link arm 51 as long as the pivot of the wastegate 40 in the opening direction is restricted by, for example, causing the wastegate 40 to contact a projection disposed in the turbine housing 30.

In the above-described embodiment, the shape of the edge 51e, which is located inside the imaginary triangle D in the link arm 51, may be modified. For example, depending on the positions of the bolt holes 38a, the distance between the tool and the link arm 51 may become comparatively great, thus decreasing the likeliness of interference of the tool with the link arm 51. In this case, the edge 51e, which is located inside the imaginary triangle D in the link arm 51, may either be curved to protrude inward with respect to the imaginary triangle D, which is rightward as viewed in FIG. 4, or extended straight.

In the above-described embodiment, the turbine housing 30 may have a modified shape. For example, the shape of the upstream-side flange 38 and the positions of the bolt holes 38a in the upstream-side flange 38 may be changed. Depending on the shape of the turbine housing 30, the bolt holes 38a may be located outside the range of the imaginary triangle D when viewed in the direction of the central axis of each bolt hole 38a. Such modification is also allowed.

The link mechanism 50 of the above-described embodiment may include other components in addition to the link arm 51, the link rod 52, and the link member 53. Depending on the attachment position of the link rod 52 with respect to the link arm 51, the relationship between the movement direction of the link rod 52 and the opening-closing directions of the wastegate 40 may become reversed. For example, if the link rod 52 is attached to the stopper portion 51b of the link arm 51, movement of the link rod 52 to one side in the longitudinal direction of the link rod 52, or leftward as viewed in FIG. 3, drives the wastegate 40 in the opening direction. Movement of the link rod 52 to the other side in the longitudinal direction, or rightward as viewed in the drawing, drives the wastegate 40 in the closing direction. This configuration is allowed as long as the coupling center position A of the link arm 51 to which the link rod 52 is coupled is located at a position offset in the direction in which the link rod 52 moves to open the wastegate 40 from the middle of the link arm 51 in the width direction W.

Techniques regarding the link arm 51 in the link mechanism 50 may be used in any link mechanism other than the link mechanism 50 for driving the wastegate 40. A variable displacement type turbocharger has multiple vanes around a turbine wheel and controls the flow amount of exhaust gas into the turbine wheel by changing the positions of the vanes. Specifically, the position of each vane is changed by transmitting driving force from an actuator to the vane through a link mechanism. A link arm of this link mechanism may employ techniques of the above-described embodiment as long as the coupling center position in the link arm to which a link rod is coupled is located at a position opposite to the direction in which force tends to be applied to the link arm (typically, the direction in which the link rod moves to decrease the amount of exhaust gas) with respect to the middle in the width direction of the link arm.

In the above-described embodiment, the configuration of the actuator 60 may be modified. For example, a linear actuator having a longitudinally movable output shaft may be employed. In this case, technical ideas of the present disclosure may be used as long as the link mechanism has the link rod 52 that is coupled to the output shaft of the linear actuator and moves from one side to the other in the longitudinal direction, thus converting the movement of the link rod 52 into rotation by means of the link arm 51. Specifically, the linear actuator may be, for example, a negative-pressure actuator operating a plunger (a piston) through air pressure or an electromagnetic actuator electrically operating a plunger (a piston).

In the above-described embodiment, as long as the internal combustion engine 100 includes the turbocharger 20, the engine 100 may be driven using any fuel. The fuel of the engine 100 may be, for example, gasoline or diesel.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A turbocharger comprising:
   a turbine housing that accommodates a turbine wheel;
   a bypass passage defined in the turbine housing, wherein the bypass passage connects an exhaust-upstream section to an exhaust-downstream section with respect to the turbine wheel, thereby bypassing the turbine wheel;
   a wastegate attached to the turbine housing to selectively open and close a downstream end of the bypass passage;
   a link mechanism coupled to the wastegate to transmit driving force to the wastegate; and
   an actuator coupled to the link mechanism, wherein
   the turbine housing has a valve seat portion in an inner wall surface of the turbine housing,
   the wastegate includes
      a valve member that contacts the valve seat portion at the time the bypass passage is fully closed, and
      a shaft that extends from the valve member and is pivotally supported by a wall portion of the turbine housing,
   the link mechanism includes
      an elongated link rod that moves from one side to the other in the longitudinal direction of the link rod by receiving the driving force of the actuator, and
      a link arm that is coupled to the link rod, converts movement of the link rod to rotation, and transmits the rotation to the shaft, and
   the longitudinal direction of the link rod in a state in which the bypass passage is fully closed is defined as a width direction of the link arm,
   a coupling center position in the link arm to which the link rod is coupled is located at a position offset in a direction in which the link rod moves to open the wastegate from a middle of the link arm in the width direction, and
   with respect to an imaginary straight line connecting the coupling center position in the link arm to which the link rod is coupled to a coupling center position in the link arm to which the shaft is coupled, a middle line of the link arm in a transverse direction orthogonal to an extending direction of the link arm is curved to protrude in a direction in which the link rod moves to fully close the bypass passage and the middle line is curved to recede with respect to a direction in which the link rod moves to fully open the bypass passage.

2. The turbocharger according to claim 1, wherein
   the turbine housing includes a fixing flange that is configured to fix the turbine housing to a member located on an exhaust-upstream side,
   the fixing flange has a bolt hole that extends through the fixing flange, wherein a bolt is inserted through the bolt hole,
   when viewed in a direction of a central axis of the bolt hole, at least part of the bolt hole is within an imaginary triangle that is defined by, in a state in which the bypass passage is fully closed, the coupling center position in the link arm to which the link rod is coupled, the coupling center position in the link arm to which the shaft is coupled, and an end of the link rod opposite to the link arm, and
   an edge of the link arm located inside the imaginary triangle is curved to protrude outward from the imaginary triangle.

\* \* \* \* \*